(12) United States Patent
Barber et al.

(10) Patent No.: US 7,569,242 B2
(45) Date of Patent: *Aug. 4, 2009

(54) SNACK FOOD HAVING LARGE BITS

(75) Inventors: Keith Alan Barber, Frisco, TX (US); Adrianna Ashley Heywood, Plano, TX (US); K. Michael King, Dallas, TX (US); Stephen Louis Rice, Highland Village, TX (US); Richard James Ruegg, Coppell, TX (US)

(73) Assignee: Frito-Lay North America, Inc, Plano, TX (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/330,631

(22) Filed: Jan. 12, 2006

(65) Prior Publication Data

US 2006/0115562 A1   Jun. 1, 2006

Related U.S. Application Data

(62) Division of application No. 10/696,970, filed on Oct. 30, 2003, now Pat. No. 7,074,445.

(51) Int. Cl.
  A23P 1/08 (2006.01)
(52) U.S. Cl. ........................ 426/292; 426/289
(58) Field of Classification Search .............. 426/292, 426/289
  See application file for complete search history.

(56) References Cited

U.S. PATENT DOCUMENTS

| | | |
|---|---|---|
| 3,689,290 A | 9/1972 | Blackstock et al. |
| 3,998,978 A | 12/1976 | Lawrence et al. |
| 4,260,637 A | 4/1981 | Rispoli et al. |
| 4,401,681 A | 8/1983 | Dahle |
| 4,500,553 A | 2/1985 | Liggett et al. |
| 4,585,657 A | 4/1986 | Karwowski et al. |
| 4,663,175 A | 5/1987 | Werner et al. |
| 4,670,272 A | 6/1987 | Chen et al. |
| 4,717,570 A | 1/1988 | Polizzano |
| 4,738,865 A | 4/1988 | Morris |
| 4,744,994 A | 5/1988 | Bernacchi et al. |
| 4,748,031 A | 5/1988 | Koppa |
| 4,755,390 A | 7/1988 | Calandro et al. |
| 4,840,803 A | 6/1989 | Polizzano |
| 4,847,098 A | 7/1989 | Langler |
| 4,853,236 A | 8/1989 | Langler |
| 4,910,028 A | 3/1990 | Bernacchi et al. |
| 4,910,031 A | 3/1990 | Budd et al. |
| 4,913,919 A | 4/1990 | Cornwell et al. |
| 4,919,953 A | 4/1990 | Palmlin et al. |
| 4,943,438 A | 7/1990 | Rosenthal |
| 4,961,942 A | 10/1990 | Cocco et al. |
| 4,961,943 A | 10/1990 | Blanthorn et al. |
| 5,080,919 A | 1/1992 | Finley et al. |
| 5,098,723 A | 3/1992 | DuBois et al. |
| 5,146,844 A | 9/1992 | Dubowik et al. |
| 5,188,855 A | 2/1993 | Bernacchi et al. |
| 5,208,059 A | 5/1993 | Dubowik et al. |
| 5,298,268 A | 3/1994 | Maegli |
| 5,405,625 A | 4/1995 | Biggs |
| 5,433,961 A | 7/1995 | Lanner et al. |
| 5,514,399 A | 5/1996 | Cordera et al. |
| 5,520,942 A | 5/1996 | Sauer et al. |
| 5,523,106 A | 6/1996 | Gimmler et al. |
| 5,532,010 A | 7/1996 | Spanier et al. |
| 5,554,681 A | 9/1996 | Patel |
| 5,595,774 A | 1/1997 | Leibfred et al. |
| 5,650,184 A | 7/1997 | Humphry et al. |
| 5,652,010 A | 7/1997 | Gimmler et al. |
| 5,698,252 A | 12/1997 | Kelly et al. |
| 5,707,448 A | 1/1998 | Cordera et al. |
| 5,723,164 A | 3/1998 | Morano |
| 5,741,505 A | 4/1998 | Beyer et al. |
| 5,770,248 A | 6/1998 | Leibfred et al. |
| 5,786,008 A | 7/1998 | Humphry et al. |
| 5,846,587 A | 12/1998 | Kelly et al. |
| 5,935,634 A | 8/1999 | Gamay et al. |
| 5,964,146 A | 10/1999 | Kelly et al. |
| 6,001,409 A | 12/1999 | Gimmler et al. |
| 6,117,477 A | 9/2000 | Paluch |
| 6,270,817 B1 | 8/2001 | Barnes et al. |
| 6,274,189 B1 | 8/2001 | Kazemzadeh |
| 6,299,916 B1 | 10/2001 | Daily |
| 6,312,746 B2 | 11/2001 | Paluch |

(Continued)

FOREIGN PATENT DOCUMENTS

EP   0815741 A2   7/1998

*Primary Examiner*—Carolyn A Paden
(74) *Attorney, Agent, or Firm*—James R. Gourley; Chad E. Walter; Carstens & Cahoon, LLP

(57) ABSTRACT

A snack food having large three-dimensional seasoning bits whereby the bits are substantially adhered to the food substrate, or chip. A topping comprising large seasoning bits and a dry adhesive is applied to a cooked chip. The topped, cooked chip is then heated to a temperature such that the dry adhesive undergoes a glass transition and flows down around the bit to the bit and food substrate contact point. The topped, cooked chip is then subjected to changed process conditions, such as cooling, the adhesive hardens, and a bond is formed between the chip and the seasoning bits.

7 Claims, 1 Drawing Sheet

U.S. PATENT DOCUMENTS

| | | |
|---|---|---|
| 6,352,732 B2 | 3/2002 | Lanner et al. |
| 6,500,474 B2 | 12/2002 | Cross et al. |
| 6,534,102 B2 | 3/2003 | Kazemzadeh |
| 7,074,445 B2 * | 7/2006 | Barber et al. ............... 426/292 |
| 2002/0187220 A1 | 12/2002 | Luhadiya |
| 2003/0017240 A1 | 1/2003 | Burke et al. |

* cited by examiner

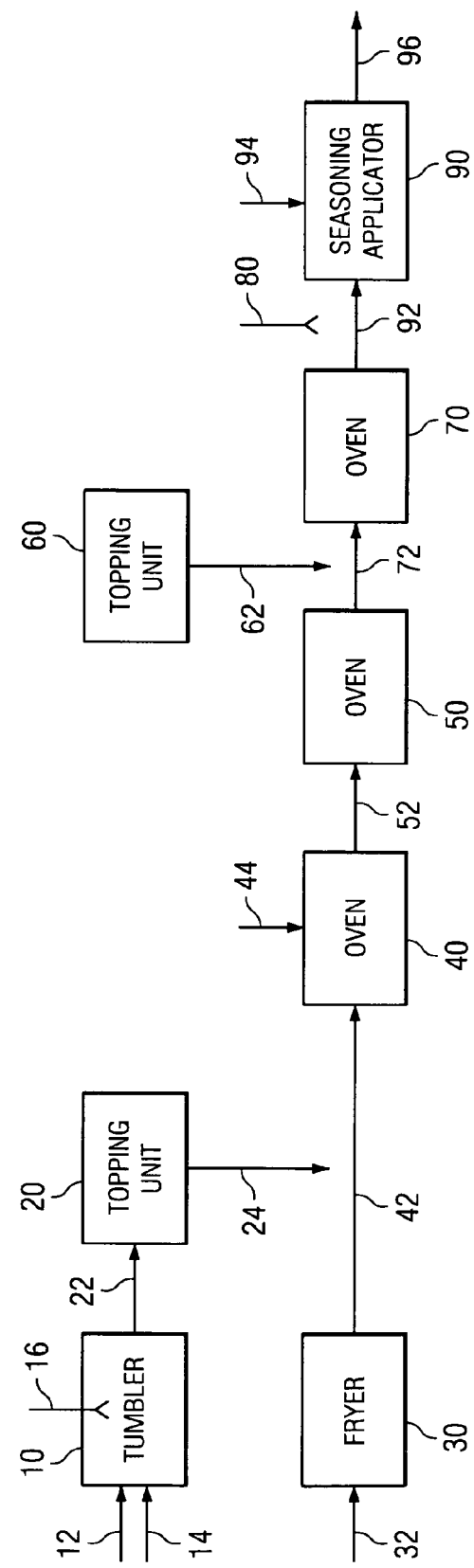

SNACK FOOD HAVING LARGE BITS

CROSS-REFERENCE TO RELATED APPLICATION

This application is a divisional of U.S. patent application Ser. No. 10/696,970, entitled "Method for Adhering Large Seasoning Bits to a Food Substrate", filed Oct. 30, 2003 now U.S. Pat. No. 7,047,445.

BACKGROUND OF THE INVENTION

1. Technical Field

The present invention relates to a method for adhering three-dimensional bits, fragments, chunks, or morsels to a substrate and more particularly, to a method for adhering large three dimensional food bits to a snack food substrate whereby the large bits are substantially adhered to the substrate.

2. Description of Related Art

Food particulates are often added to foods, especially snack foods. Tortilla chips, pretzels, crackers, popcorn, and numerous other foodstuffs often have seasonings applied to them during processing. Seasonings used, usually in a powdered form, have included salt, cheese, chili, garlic, Cajun spice, ranch, sour cream and onion, among many others. However, there is often an undesirable accumulation of seasoning on the sidewalls and bottom of the snack food bag with the result that the consumer has less than the desired complement of topping thereon. The separation occurs because of insufficient adhesion of the seasoning to the chip. The problem of separation increases with the size and weight of the individual particles.

One way this problem has been approached in the past was by using oil as an adhesive to adhere particulate seasonings to a base or substrate. For example U.S. Pat. No. 6,534,102 B2, issued to Kazemzadeh, discloses a seasoning bit that, following extrusion and cooking is immersed into an oil and seasoning slurry at an elevated temperature. The product is then dry-coated with seasonings or sprayed with hot or room temperature oils and fats either carrying seasonings or the seasonings are applied as dusting on the surface while the oil and fats are used to adhere the seasoning to the surface. One drawback to using only oil, however, is that the adhesive strength of traditional oil mixes are not strong enough to adhere large three-dimensional bits to a substrate surface. In certain applications, large three-dimensional bits are desirable because they enable packaged snack chips to emulate another topped product including, but not limited to a pizza with toppings, a nacho chip, or a tostada.

Another prior art composition used to adhere particulate to a food product is U.S. Pat. No. 3,689,290 issued to Blackenstock et al which discloses using a coating agent comprised of dry corn syrup solids to adhere small particle sizes of food toppings to a substrate. The Blackenstock patent discloses a particle size of the food topping as being 12-100 mesh, which corresponds to a particle size range of 0.150 to 1.68 millimeters (0.0059 to 0.0661 inches). Again, these are relatively small particle sizes that are being adhered to a substrate. The adhesive is not strong enough to adhere a substantial amount of larger three-dimensional particles to the chip.

U.S. Patent Application 2002/0187220 A1 discloses an edible particulate adhesive comprising maltodextrin, an edible surfactant, a solvent, a polysaccharide, and a modified starch. The invention, however, is clearly aimed at very small particulate adhesion. The invention indicates the preferred particle size is less than 650 micrometers. Thus, this invention also fails to adhere relatively large bits to a chip.

Another prior art composition used to adhere flavorings to a foodstuff is illustrated by European Patent EP 0 815 741 A2 which discloses a hot melt composition comprising a starch, such as corn syrup, maltodextrin, or an amylase-treated starch, and a plasticizer, such as a polyol or a polyacetic acid. Like the other inventions, this invention was also designed to adhere powdery-type particulate additives to foodstuffs such as salt, sugar, cheese powder, and ranch seasonings. Like other inventions in the prior art, it also fails to adhere relatively large bits to chips.

One prior art approach to adhere large food flavorings and spices was to put the flavorings on an unbaked cracker. Thus, cheese flavorings and other spices were then baked into the dough. This approach, however, cannot be used when it is desirable to adhere particles to a substantially cooked snack piece, such as a tortilla chip, immediately prior to the addition of seasoning.

Consequently a need exists for a method to adhere large particulate flavoring bits, fragments, chunks, or morsels to a food substrate. The method should allow a snack food to demonstrate the characteristic look, texture, and taste of an emulated topped food product, yet be highly resistant to separation. The method should be adaptable to a product line wherein the addition of the large particles occurs at a step after substantial cooking of the underlying food substrate.

SUMMARY OF THE INVENTION

The proposed invention uses a combination of dry-powdered adhesives admixed onto bits and placed on a food substrate and wherein further the adhesive undergoes a glass transition and flows down around the bit to the bit and food substrate contact point. Subsequently, process conditions change, and the adhesive undergoes another glass transition back to an amorphous solid which hardens the adhesive and adheres the bit to the food substrate surface.

Hence, this invention produces a snack food substrate having large seasoning bits to achieve the look and taste of an emulated topped food product. In addition, the instant adhesive provides a topping that is highly resistant to separation. Furthermore, the large bits can be adhered following the cooking of the underlying food substrate.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a schematic representation of one embodiment of the new process.

DETAILED DESCRIPTION

An embodiment of the innovative invention will now be described with reference to FIG. 1. Seasoning, flavoring or illustrative bits 12 and an adhesive 14 are mixed together in a 30-inch diameter mixer or tumbler 10. In a preferred embodiment, vegetable oil 16, preferably at a temperature of about 23 to 32° C. (74 to 90° F.), is sprayed into the tumbler 10 to coat the seasoning bits 12 to function as a temporary liquid adhesive 16 and promote bonding between the dry adhesive 14 and the seasoning bits 12. In an alternative embodiment, the temporary liquid adhesive 16 is heated to a temperature of about 43 to 60° C. (109 to 140° F.) prior to being sprayed in the tumbler 10. The temporary adhesive 16 used can be any prior art adhesive oil including, but not limited to, olestra®, corn oil, soybean oil, cottonseed oil, or palm oil. Alternatively, an oil substitute can be used as a temporary liquid adhesive 16. The objective is to coat the seasoning bits 12 to promote bonding with the dry adhesive 14 during mixing and until the dry adhesive 14 undergoes a glass transition phase. Any temporary liquid adhesive 16 that meets this objective can be used. Examples of an oil substitute that could be used as a temporary adhesive includes, but is not limited to glycerol, propylene glycol, alcohol, and mixtures thereof. A temporary liquid adhesive 16 may not be needed if the particle size of the dry adhesive 14 is small enough, and/or the individual bits 12 are porous enough, and/or the bit has a moist hydroscopic or oily exterior.

The tumbler 10 is a cylindrical device that rotates and is typically used to add seasoning to a substrate's total circumference. In this invention, however, the tumbler is used to admix adhesive 14 to the seasoning bit 12. Thus, although a tumbler 10 is described in this embodiment, any equivalent device including but not limited to, a mixer, a tumbler including a batch tumbler or a continuous tumbler, or a blender such as a batch blender, continuous blender, or ribbon blender may be used to admix the adhesive 14 to the seasoning bit. As used in this invention, a substrate is substantially cooked and can be a fried or baked snack food chip made from a dough, such as masa or other starch based dough. As used in this invention the terms substrate and chip are used interchangeably and refer to any wide variety of snack food items that are commonly commercially available including, but not limited to, potato chips, crackers, multigrain chips, corn chips, and tortilla chips.

Seasoning bits 12 comprising Textured Vegetable Protein, flavored vegetable bits, or colored bits are commercially available. For example, Bac'n Pieces™ Bacon Flavored Bits can be purchased from McCormick® of Sparks, Md. in many local grocery stores.

As used herein, large seasoning bits 12 are food grade seasonings wherein at least 5% of the bits, by weight, have a diameter exceeding 1.7 millimeters and are substantially between 1.7 and 17.0 millimeters diameter.

Following admixing in the tumbler 10, the seasoning bits 12 and adhesive 14 are then transferred 22 to a first topping unit 20. A topping unit 20 manufactured by Raque, of Louisville, Ky. can be used. In one embodiment, the dry adhesive 14 used is corn syrup solids with a Dextrose Equivalent more than 20. Corn Syrup Solids are defined by the FDA as dried glucose syrups in which the reducing sugar content is 20 Dextrose Equivalent or higher. However, numerous other carbohydrate adhesives could be used including, but not limited to dextrose, dextrin, maltodextrose, sucrose, and polydextrose. These carbohydrates can be purchased from various suppliers including National Starch and Chemical Company of Bridgewater, N.J., Danisco Cultor of New Century, Kans., and Tate & Lyle PLC located in London, England.

Again, although this invention is described with reference to a fried tortilla chip, any food substrate including, but not limited to, a chip, cracker, baked chip, or puffed snacks, could be used. Prior to the chip entering the fryer 30, the chip is made by any one of a number of standard methods well known in the art. Typically, a dough product is compressed between a pair of counter rotating sheeter rollers that are located closely together, thereby providing a pinch point through which the dough is formed into sheets. The dough can then be cut by, for example, a cutting roller to form the shape of the product desired. Alternatively, the dough or masa is extruded and cut into a desired chip shape. After the dough or masa is cut, the chips are transported towards and through a toaster. For this, the chips are deposited onto a moving belt. After toasting, the shaped chips have increased stiffness for insertion into a fryer 30. In one embodiment, the toasted chips prior to being fried, are passed through a proofing stage where the chips are exposed to ambient air for a specified amount of time to equilibrate moisture. After proofing, chips are transferred to a fryer 30. To convey the chips into the fryer 30, the chips are removed from the toasting belt or conyerer and placed onto the fryer conyerer 32. Because flat substrate facilitates even application of the seasoning bits 12, in the preferred embodiment, a monolayer fryer 30 is utilized to help ensure a flat substrate and minimize chip curl. The monolayer fryer 30 has two belts; an upper belt and a lower belt. The substrate is positioned between the two belts as it moves through the fryer 30. The two-belt system minimizes chip curl and keeps the chip flat as it moves through the fryer. The chip, in the example of a tortilla chip, is in the monolayer fryer for a dwell time of about 52 to 56 seconds at a temperature of about 170-207° C. (338-404° F.). In an alternative embodiment, any fryer 30 known in the art can be used. After exiting the fryer 30, the substrate proceeds along an open mesh conyerer belt 42. The seasoning bits 12 and adhesive 14 are then applied 24 to the chip via a topping unit 20 or other topping means.

The chip is then sent to a first oven 40. An impingement oven such as model IMDJ-45AS-1, manufactured by Heat and Control, Inc., of Hayward, Calif. can be used as the first oven. The chip is transported through the first oven 40 on an open mesh conyerer belt for approximately 17 seconds. The elevated oven temperature, preferably about 190 to 232° C. (374-450° F.), serves to trigger the glass transition phase of the dry adhesive 14 onto the substrate. In one embodiment, steam 44 between 6.9 and 34.5 kPa (1 and 5 psi) is injected into the first oven 40 to expedite activation of the dry adhesive 14 by lowering the glass transition temperature of the adhesive via the addition of water vapor. In this embodiment, the chip then proceeds out of the first oven 40 along the open mesh conyerer belt 52 into a second oven 50 to drive off the moisture added in the first oven as steam. In the second oven 50, the chip proceeds on an open mesh conyerer belt for approximately 17 seconds at an elevated temperature range of about 190 to 232° C. (374 to 450° F.). The second oven 50 can be a make and model identical to the first oven 40.

In an alternative embodiment, only one oven, without steam, is used to trigger the glass transition phase of the dry adhesive. In such an embodiment, the oven temperature remains the same about 190 to 232° C. (374 to 450° F.). In addition, the total dwell time also remains the same at about 34 seconds. In alternative embodiments, longer or shorter dwell times and higher or lower temperatures could be used. The dwell time and temperature need only be sufficient to promote a glass transition change in the dry adhesive 14. An AirForce® impingement oven, manufactured by Heat & Control, Inc. of Hayward, Calif. can be used as in the single-oven embodiment. As used herein, an adhering means for adhering a seasoning bit to a substrate is meant to include any edible carbohydrate blend that undergoes a glass transition change at an adhesive (as opposed to oven) temperature between 40 and 60° C. when the adhesive has a moisture content of between about 4 to 8%. As those skilled in the art are aware, the glass transition temperature range of the dry adhesive 14 changes relative to the moisture content. The higher the moisture content, the lower the glass transition temperature range.

Converesely, the lower the moisture content, the higher the glass transition temperature range. Thus, if the moisture content of the adhesive is raised above or below 4 to 8%, then the corresponding glass transition temperature range will change as well. However, such changes should be construed to be within the spirit and scope of the claimed invention.

The chip then proceeds out of the second oven 50 along the open mesh conveyer belt 72 where it begins to cool. In one embodiment, the chip cools for approximately 30 seconds. The dry adhesive 14 hardens on cooling to affect a strong bond between the seasoning bits 12 topping and the substrate.

In one embodiment, the steps of adding and heating the seasoning bits 12 above the glass transition temperature of the dry adhesive 14 and then allowing the seasoning bit 12, adhesive 14, and substrate to cool below the adhesive's 14 glass transition temperature could be repeated to form a multi-layered chip. By repeating these steps, two or more layers of seasoning bits 12 could be added to a single substrate or chip. In a preferred embodiment of the invention, a second topping, preferably, but not necessarily, in the form of cheese shreds, a cheese-like topping, or a cheese topping is then applied to the bit-topped substrate via a second topping unit 60. Unlike the first topping comprising the bits, the second topping has a lower melting temperature than the seasoning bits 12 of the first topping and no additional adhesive is required to adhere the second topping to the substrate. The second topping unit 60 can be the same model and type as first topping unit 20. Following application of the second topping, the chip is then routed to a third oven 70. The third oven 70 is preferably an infrared Raymax 1525, manufactured by Watlow Electric Manufacturing Company, of St. Louis, Mo. The chip is routed to a third oven 70 on an open mesh conveyer belt 72. The chip proceeds through the third oven 70 for a dwell time of approximately 60 seconds with an oven temperature about 82 to 138° C. (180 to 280° F.). In alternative embodiments, shorter or longer dwell times and higher or lower temperatures could be used. The dwell time and temperature need only be sufficient to melt the second set of toppings. The chip then proceeds out of the third oven 70 on an open mesh conveyer belt 92 where it is sprayed with an atomized oil or other liquid adhesive from both the top and the bottom. Unlike the temporary adhesive 16, the objective with this liquid adhesive is to provide a more permanent adhesive to bind a seasoning with the chip and the toppings. An oil spray applicator 80 manufactured by GOE-Avins of Amherst, N.Y., model #OSM-5000-BP-3065 can be used. Although many types of liquid adhesives including lard, other animal-based oils, and vegetable-based oils can be used as the atomized spray, a preferred embodiment uses corn or soybean oil. The liquid adhesive or oil should be sprayed at an elevated temperature, preferably about 43 to 60° C. (109 to 140° F.). Following oil atomization, the chip passes through a seasoning applicator 90 where a particulate flavored seasoning 94 is applied to both sides of the chip. The seasoning applicator 90 first applies seasoning 94 to the topside of the chip on an open mesh conveyer belt. The chip is then flipped onto another open mesh conveyer belt and the other side is then seasoned. A seasoning applicator manufactured by ARBO of Toronto, Ontario, Canada model number KDC-VV 12"×20"×45" can be used. The chip may then be further cooled and sent to be packaged 96.

While this invention has been particularly shown and described with reference to a preferred embodiment, it will be understood by those skilled in the art that various changes in form and detail may be made therein without departing from the spirit and scope of the invention.

What is claimed is:

1. A packaged, topped snack food comprising, in proportions based upon the total weight of the topped chip:
    about 5 to 30% by weight of a food substrate;
    about 40 to 95% of an adhesive-bit mix, wherein said bits are substantially between 1.7 to 17 mm in diameter wherein said bits comprise:
    about 30 to 85% three-dimensional bits;
    about 0 to 10% temporary non-aqueous liquid adhesive; and
    about 15 to 60% a dry adhesive wherein said adhesive provides an adhering means for adhering the bits to the chip;
    about 0 to 10% cheese;
    about 0 to 10% non-aqueous liquid adhesive; and
    about 0 to 10% seasoning powder.

2. The snack food in claim 1 wherein said food substrate comprises a fried food substrate.

3. The snack food in claim 1 wherein said food comprises a baked food substrate.

4. The snack food in claim 1 wherein said food substrate comprises an extruded food substrate.

5. The snack food claim 1 wherein said adhesive comprises corn syrup solids with a Dextrose Equivalent of 20 or greater.

6. The snack food in claim 1 wherein said food substrate is substantially flat.

7. The snack food in claim 1 wherein said food substrate comprises a food substrate cooked in a monolayer fryer.

\* \* \* \* \*